(12) United States Patent
Weaver et al.

(10) Patent No.: US 11,480,212 B2
(45) Date of Patent: Oct. 25, 2022

(54) NUT LOCKING FEATURE

(71) Applicant: PRATT & WHITNEY CANADA CORP., Longueuil (CA)

(72) Inventors: Paul Weaver, Chateauguay (CA); John Wilson, Pointe-Claire (CA); Michel Desjardins, St-Hubert (CA); Herve Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 365 days.

(21) Appl. No.: 16/567,298

(22) Filed: Sep. 11, 2019

(65) Prior Publication Data

US 2021/0070423 A1    Mar. 11, 2021

(51) Int. Cl.
| | | |
|---|---|---|
| *F16H 1/28* | (2006.01) | |
| *F16B 39/10* | (2006.01) | |
| *F16H 57/08* | (2006.01) | |
| *F02C 7/32* | (2006.01) | |
| *F02C 7/36* | (2006.01) | |
| *B64C 11/02* | (2006.01) | |
| *F01D 25/34* | (2006.01) | |

(52) U.S. Cl.
CPC ............ *F16B 39/108* (2013.01); *F02C 7/32* (2013.01); *F02C 7/36* (2013.01); *F16H 57/082* (2013.01); *B64C 11/02* (2013.01); *F01D 25/34* (2013.01); *F16H 1/28* (2013.01)

(58) Field of Classification Search
CPC ...... F16H 57/082; F16B 39/10; F16B 39/101; F16B 39/103; F16B 39/108; F02C 7/36; F02C 7/32; B64C 11/02; F05D 2260/40311; F05D 2260/31

USPC .......................................................... 475/331
See application file for complete search history.

(56) References Cited

U.S. PATENT DOCUMENTS

| | | | |
|---|---|---|---|
| 3,970,398 | A | 7/1976 | Wilson |
| 5,205,189 | A * | 4/1993 | Wesling .................. F01D 5/027 464/180 |
| 7,690,206 | B2 | 4/2010 | Servant |
| 7,870,744 | B2 | 1/2011 | Galivel et al. |
| 2006/0293142 | A1 * | 12/2006 | Torres ..................... F16C 25/06 475/331 |
| 2017/0356388 | A1 * | 12/2017 | Sheridan .................. F02C 3/04 |
| 2018/0023471 | A1 | 1/2018 | Lefebvre et al. |
| 2018/0320564 | A1 * | 11/2018 | Pluta ..................... F16H 57/082 |

(Continued)

FOREIGN PATENT DOCUMENTS

DE    102014116227 A1 *  4/2015  ............. F16B 39/12

*Primary Examiner* — Roger L Pang
(74) *Attorney, Agent, or Firm* — Norton Rose Fulbright Canada LLP (57) ABSTRACT

An assembly comprising: a nut having a cylindrical body with a threaded external surface, an axially extending interior tool socket, and a radially outwardly extending flange at a proximal end of the cylindrical body; a first component including a hollow cylindrical tube with a connector end having a radially inwardly extending shoulder, the radially inwardly extending shoulder abutting the radially outwardly extending flange of the nut in an assembled position; and a second component including an annular hub with a threaded internal surface matching the threaded external surface of the nut, and an annular mounting surface abutting the connector end of the propeller shaft in the assembled position.

21 Claims, 5 Drawing Sheets

(56) References Cited

U.S. PATENT DOCUMENTS

2018/0334964 A1* 11/2018 Desjardins ................ F02C 7/06
2019/0048802 A1* 2/2019 Desjardins ................ F16H 1/28

* cited by examiner

NUT LOCKING FEATURE

TECHNICAL FIELD

The disclosure relates to a fastening system and, more particularly, to a fastener nut and an anti-rotation locking washer suitable for securing a hollow shaft to a planetary gear carrier within a reduction gear box of a gas turbine engine.

BACKGROUND

The reduction gearbox (RGB) for aircraft turbine engine may include a planetary gear carrier that must be rigidly secured to a propeller shaft with close fitting connecting surfaces and an axial clamping load. The axial clamping load is provided by a threaded connection, consisting of a nut with an anti-rotation locking feature, engaging the propeller shaft and the planetary gear carrier.

Torque is applied to the nut which provides the appropriate axial clamping load between the joined parts. The anti-rotation locking feature serves to lock the nut in a rotational position and to prevent the nut from rotating relative to the planetary gear carrier during operation. Unintended reverse rotation of the nut during operation reduces the axial clamping load and if the nut is dislodged, catastrophic failure may occur.

The nut connecting the propeller shaft and the planetary gear carrier is generally secured with a specialized tool and torque wrench to transmit a suitable tightening torque and axial clamping load. The nut and associated locking elements must be accessible in the assembled condition for inspection and maintenance. Conventional fastener nuts for a connecting propeller shaft and a planetary gear carrier may extend the axial length of the connection and may be accessible with tools from one side of the connection only. Improvement is desirable.

SUMMARY

In one aspect, the disclosure describes an assembly comprising: a nut having a cylindrical body with a helically threaded external surface, an axially extending interior tool socket, and a radially outwardly extending flange at a proximal end of the cylindrical body; a first component including a hollow cylindrical tube with a connector end having a radially inwardly extending shoulder, the radially inwardly extending shoulder abutting the radially outwardly extending flange of the nut in an assembled position; and a second component including an annular hub with a helically threaded internal surface matching the helically threaded external surface of the nut, and an annular mounting surface abutting the connector end of the first component in the assembled position.

In a further aspect, the disclosure describes a method of connecting a propeller shaft to a planetary gear carrier in a reduction gear box of a gas turbine engine, the method comprising: inserting, into a hollow cylindrical propeller shaft, a distal end of a nut having a cylindrical body with a helically threaded external surface; abutting a radially outwardly extending flange of the nut with a radially inwardly extending shoulder at a connector end of the propeller shaft; engaging a torque wrench tool in an axially extending interior tool socket of the nut; and engaging the helically threaded external surface of the nut with a helically threaded internal surface of an annular hub of a planetary gear carrier in an assembled position. Embodiments can include combinations of the above features.

Further details of these and other aspects of the subject matter of this application will be apparent from the detailed description included below and the drawings.

DETAILED DESCRIPTION

Figure 1:
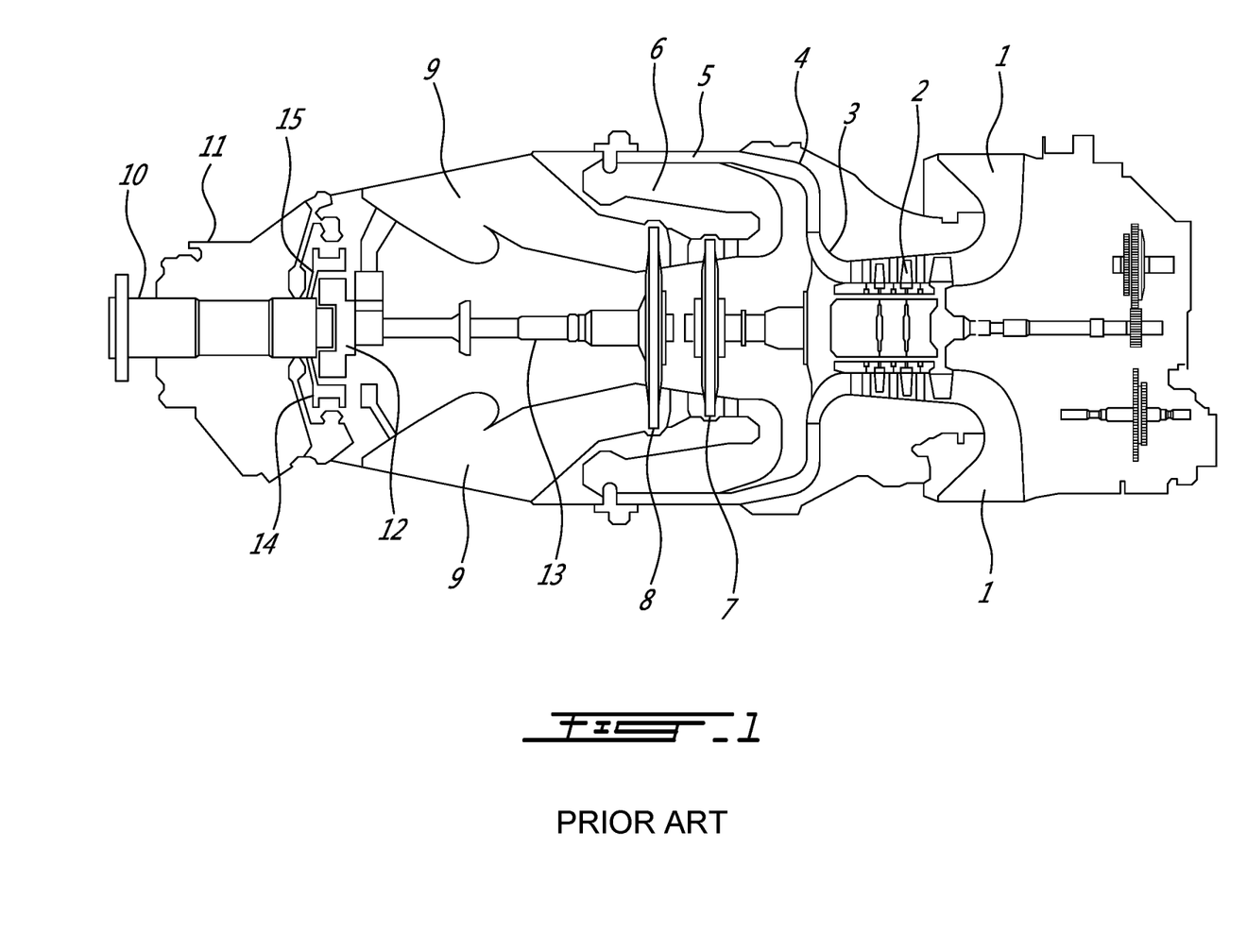
FIG. 1 shows an axial cross-section view of an example turbo-shaft gas turbine engine, in particular (to the left) showing a reduction gear box surrounding a propeller shaft.

FIG. 1 shows an axial cross-section through an example turbo-shaft gas turbine engine, namely a Pratt & Whitney PT6 engine. The air intake 1 draws air into the engine to pass through the low-pressure axial compressor 2 and high-pressure centrifugal compressor 3. Compressed air exits the HP compressor 3 through a diffuser 4 and is contained within a plenum 5 that surrounds the combustor 6. Fuel is supplied to the combustor 6 and is mixed with air from the compressor 6 when sprayed through nozzles into the combustor 6 as a fuel air mixture that is ignited. The hot gases from the combustor 6 pass over the high pressure turbine 7 and low pressure turbine 8 before exiting the exhaust duct 9 of the engine.

The propeller shaft 10 within the reduction gear box 11 is driven by the sun gear 12 and low pressure engine shaft 13. The central sun gear 12 engages with multiple planetary gears 14 that are mounted in a planetary gear carrier 15. The present description relates to the assembly of the planetary gear carrier 15 to the propeller shaft 10.

Figure 2:
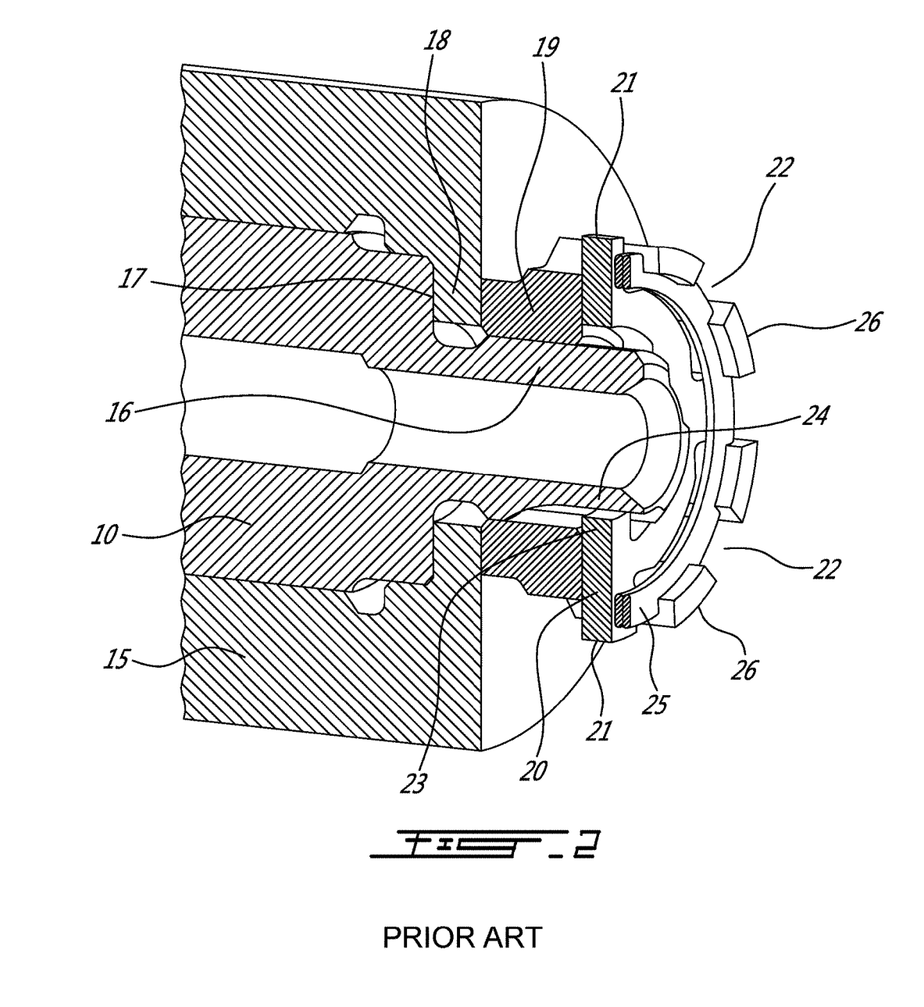
FIG. 2 is an axial sectional view through the internal propeller shaft and external planetary gear carrier of the example in FIG. 1 that are secured together with a castellated nut internally threaded on the externally threaded distal end of the propeller shaft, with an anti-rotation washer and washer retention ring engaging the castellated end of the nut.

FIG. 2 shows an axial sectional view through the internal propeller shaft 10 and external planetary gear carrier 15 of FIG. 1. The propeller shaft 10 has an externally threaded distal end 16 that extends beyond the abutment shoulder 17 of the propeller shaft 10. The abutment shoulder 17 engages an abutment flange 18 at the distal end of the planetary gear carrier 15. The propeller shaft 10 and planetary gear carrier 15 are clamped and secured together with a castellated nut 19. The internally threaded castellated nut 19 is torqued on to the externally threaded distal end 16 of the propeller shaft 10 to exert an axial clamping load on the abutment shoulder and abutment flange. To prevent the nut 19 from rotating during engine operation, an anti-rotation washer 20 has multiple external tabs 21 engaging multiple slots 22 in the castellated distal end of the nut 19. In the example shown in FIG. 2, the anti-rotation washer 20 has an internal tab 23 engaging a flat keyway 24. The positive engagement of the internal tab 23 with the flat keyway 24 of the propeller shaft 10 and the positive engagement of the external tabs 21 with the slots 22 of the castellated nut 19 prevent rotation of the nut 19 relative to the propeller shaft 10. A resilient spring retention ring 25 is mounted in retention slots within the posts 26 of the castellated nut 19. The retention ring 25 prevents axial dislodging of the anti-rotation washer 20. It will be appreciated that the nut 19, anti-rotation washer 20, retention ring 25 and posts 26 extend the axial length of the propeller shaft 10. The nut 19 is accessible only from the distal end, i.e. to the right as shown in FIG. 2.

Figure 3:
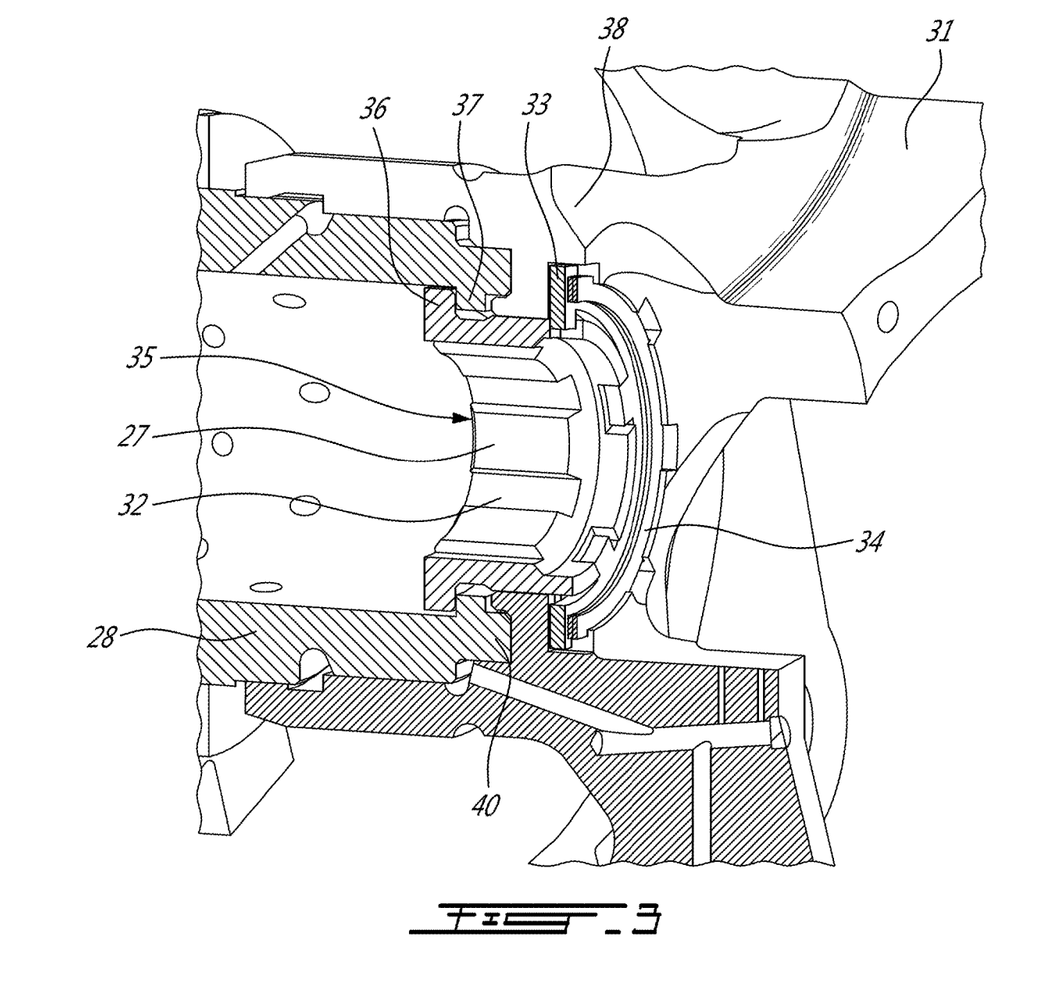
FIG. 3 is an axial sectional view in accordance with the present description showing a tubular nut within the hollow propeller shaft with a threaded external surface engaging a threaded internal surface of the planetary gear carrier, the nut having axial grooves to engage a splined torque wrench tool from either axial end of the hollow tubular nut.
Figure 4:
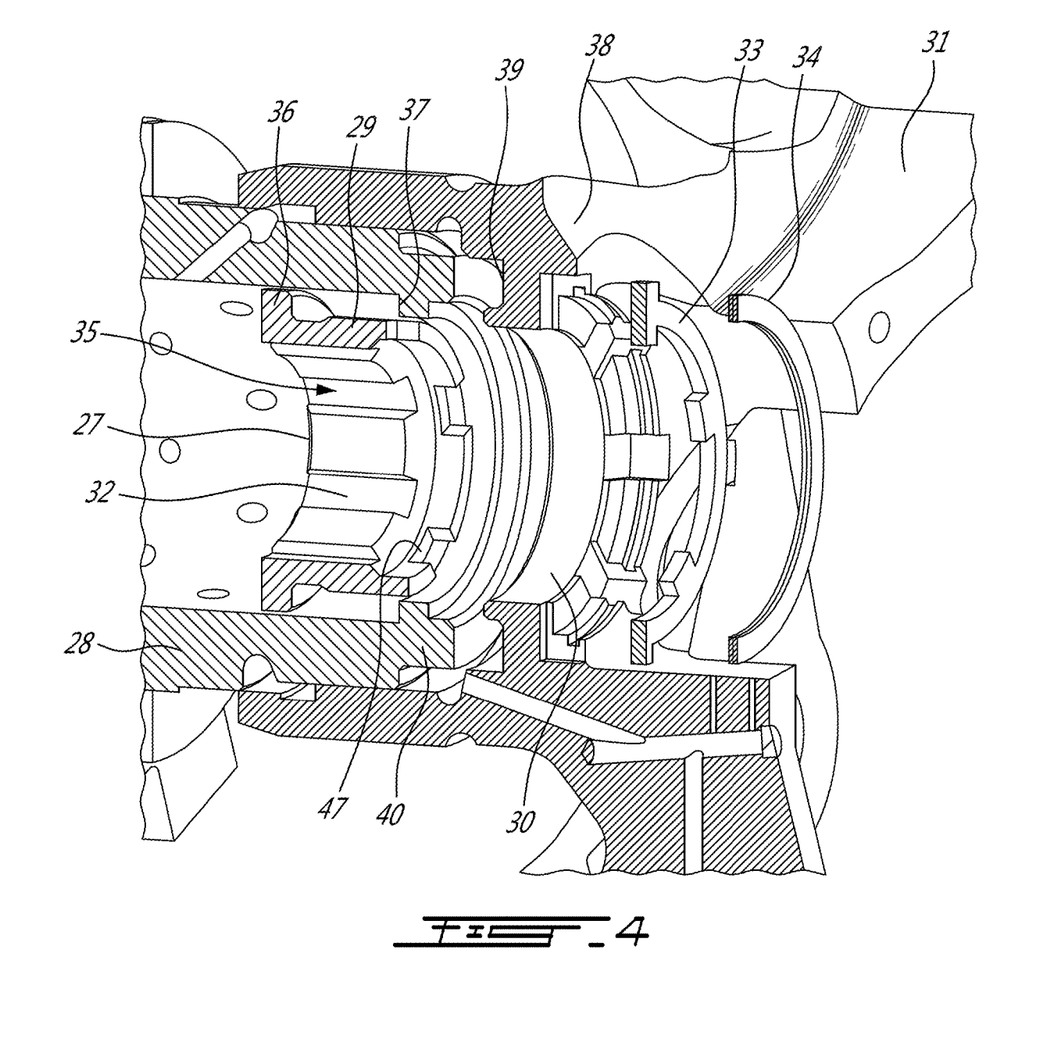
FIG. 4 is an exploded axial sectional view of the assembly of FIG. 3, in particular showing the interlocking and clamping surfaces of the internal nut, hollow propeller shaft, externally mounted planetary gear carrier, the anti-rotation washer and the washer retention ring.
Figure 5:
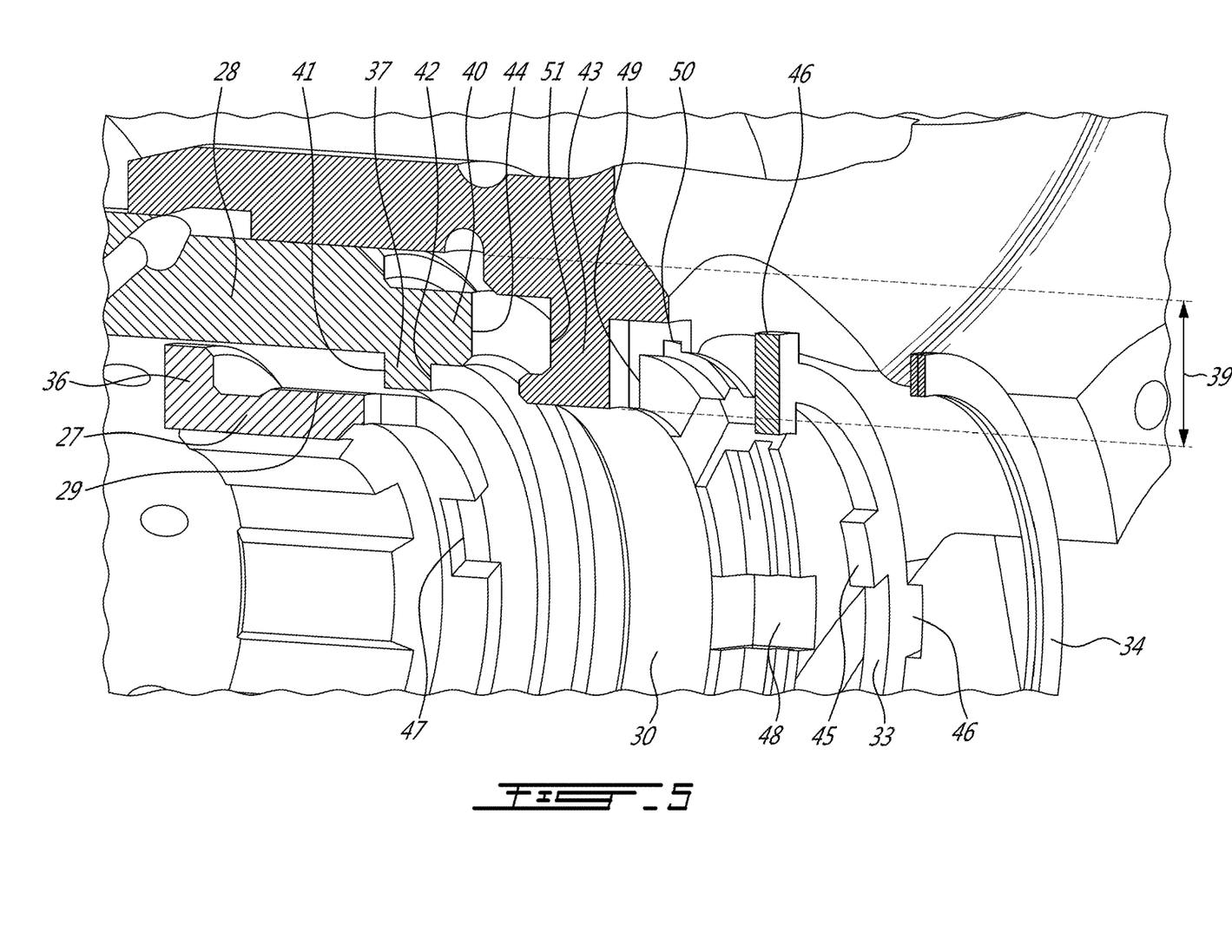
FIG. 5 is an exploded detail view of the abutting surfaces of the nut, propeller shaft and planetary gear carrier of FIG. 4.

FIGS. 3 to 5 show an axial sectional view in accordance with the present description with a tubular nut 27 that is inserted from left to right into a hollow propeller shaft 28. As best seen in the exploded view of FIG. 4, the tubular nut 27 has a threaded external surface 29 engaging a threaded internal surface 30 of the planetary gear carrier 31. The tubular nut 27 has axial grooves 32 to engage a splined torque wrench tool (not shown) from either axial end of the hollow tubular nut 27 The torque wrench tool can access the nut 27 through the central bore of the hollow propeller shaft 28 or through a central opening in the planetary gear carrier 31. An anti-rotation washer 33 and retention ring 34 prevent rotation of the nut 27 in the assembled position shown in FIG. 3.

As seen in FIG. 4, the assembly of the propeller shaft 28 and planetary gear carrier 31 proceeds as follows. The nut 27 has a cylindrical body with a helically threaded external surface 29, and an internal wrenching feature, such as an axially extending tool socket 35. In the example shown, the tool socket 35 extends through the cylindrical body of the nut 27 from the proximal end to the distal end. In the example shown, the tool socket 35 includes one or more axial grooves 32. The example shows an axially extending interior tool socket 35 with a circumferentially spaced apart series of axial grooves 32 or splines. Alternatives include a hexagonal socket or various other keyway shapes that could be machined by broaching.

Referring to FIG. 4, the tubular nut 27 has a radially outwardly extending flange 36 at the proximal end of the cylindrical body. The hollow propeller shaft 28 is formed as a hollow cylindrical tube with a connector end 40 having a radially inwardly extending shoulder 37. The radially inwardly extending shoulder 37 abuts the radially outwardly extending flange 36 of the nut 27 in an assembled position shown in FIG. 3.

The planetary gear carrier 31 has a central annular hub 38 with a helically threaded internal surface 30 matching the helically threaded external surface 29 of the nut 27. An axially facing annular surface 39 of the central annular hub 38 is configured to abut a corresponding axially facing distal end surface of the connector end 40 of the propeller shaft 28 in the assembled position of FIG. 3.

Referring to FIGS. 3 and 5, a proximal surface 41 of the radially inwardly extending shoulder 37 of the propeller shaft 28 and the radially outwardly extending flange 36 of the nut 27 provide a folding flange arrangement at the connector end as a way to add more threads without extending the length of the nut, hence shorter and lighter engine (FIG. 3).

The connector end 40 of the propeller shaft 28 has an annular ridge 44. The proximal surface of the radially inwardly extending flange 43 of the planetary gear carrier 31 includes an annular groove 51. The annular groove 51 engages the annular ridge 44 on the connector end 40 of the propeller shaft 28, in the assembled position (FIG. 3). As seen in FIG. 3, as assembled, the interlocking fitted surfaces of the propeller shaft 28 and planetary gear carrier 31 are secured in position by the torqueing of the externally threaded tubular nut 27 that engages the internally threaded surface 30 (see FIGS. 4-5) of the central annular hub 38 of the planetary gear carrier 31.

The tubular nut 27 is prevented from rotating relative to the planetary gear carrier 31 in the assembly position (FIG. 3) by an anti-rotation washer 33 and a retention ring 34 as follows. Referring to the exploded views in FIGS. 4-5, the anti-rotation washer 33 has an annular body with at least one internal tab 45 extending radially inwardly and at least one external tab 46 extending radially outwardly. The distal end of the nut 27 includes at least one inward anti-rotation slot 47 engaging the internal tab 45 of the anti-rotation washer 33 in the assembled position (FIG. 3). The planetary gear carrier 31 includes at least one outward anti-rotation slot 48 engaging the external tab 46 of the anti-rotation washer 33 in the assembled position (FIG. 3).

In the example illustrated, the planetary gear carrier 31 includes an annular washer seat recess 49 matching the central annular body of the anti-rotation washer 33. The outward anti-rotation slot 48 extends radially from the annular washer seat recess 49.

The washer retention ring 34 is disposed in a retention recess 50 within the planetary gear carrier 31. The retention recess 50 is axially distal relative to the annular washer seat recess 49. The retention ring 34 impedes any axial motion of the anti-rotation washer 33.

In the example shown, the distal end of the nut 27 includes a circumferentially spaced apart plurality of inward anti-rotation slots 47 forming a castellated distal end. The planetary gear carrier 31 includes a circumferentially spaced apart plurality of outward anti-rotation slots 48. Likewise the anti-rotation washer 33 includes a circumferentially spaced apart plurality of internal tabs 45 extending radially inwardly and a circumferentially spaced apart plurality of external tabs 46 extending radially outwardly. On assembly the tabs 45 and 46 are engaged in one or more slots 47 and 48 so that the positive engagement impedes rotation of the nut 27 relative to the planetary gear carrier 31.

The assembly described herein provides an axial length reduction compared to the example shown in FIG. 2. Further the tubular nut 27 is accessible with a torque wrench tool from both axial ends. The described assembly can result in a shorter axial length which can reduce weight and axial dimensions of the reduction gear box.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. For instance, while the fastening system has been described in the context of a RGB planet carrier, it is understood that it could be used to assemble other components. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An assembly comprising:
    a nut having a cylindrical body with a helically threaded external surface, an interior tool socket, and a radially outwardly extending flange at a proximal end of the cylindrical body, the interior tool socket extending through the cylindrical body from the proximal end to the distal end;
    a first component including a hollow cylindrical tube with a connector end having a radially inwardly extending shoulder, the radially inwardly extending shoulder abutting the radially outwardly extending flange of the nut in an assembled position; and
    a second component including a helically threaded internal surface matching the helically threaded external surface of the nut, and a mounting surface abutting the connector end of the first component in the assembled position;
    wherein the first component is a shaft, and the second component is a planetary gear carrier.

2. The assembly according to claim 1 wherein the interior tool socket includes at least one axial groove.

3. The assembly according to claim 2 wherein the interior tool socket includes a circumferentially spaced apart plurality of axial grooves.

4. The assembly according to claim 1 further comprising:
    an anti-rotation washer having an annular body with an internal tab extending radially inwardly and an external tab extending radially outwardly;
    the distal end of the nut including an inward anti-rotation slot engaging the internal tab of the anti-rotation washer in the assembled position; and
    the second component including an outward anti-rotation slot engaging the external tab of the anti-rotation washer in the assembled position.

5. The assembly according to claim 4 wherein the second component includes an annular washer seat recess matching the annular body of the anti-rotation washer and wherein the outward anti-rotation slot extends radially from the annular washer seat recess.

6. The assembly according to claim 5 comprising:
    a washer retention ring disposed in a retention recess within the second component in the assembled position, the retention recess being axially distal relative to the annular washer seat recess.

7. The assembly according to claim 4 wherein the distal end of the nut includes a circumferentially spaced apart plurality of inward anti-rotation slots.

8. The assembly according to claim 7 wherein the second component includes a circumferentially spaced apart plurality of outward anti-rotation slots.

9. The assembly according to claim 8 wherein the anti-rotation washer includes a circumferentially spaced apart plurality of internal tabs extending radially inwardly and a circumferentially spaced apart plurality of external tabs extending radially outwardly.

10. The assembly according to claim 1 wherein:
    a proximal surface of the radially inwardly extending shoulder of the first component abuts the radially outwardly extending flange of the nut in the assembled position; and wherein a distal surface of the connector end of the first component abuts the mounting surface of the second component in the assembled position.

11. The assembly according to claim 10 wherein:
    the connector end of the first component includes an annular ridge; and
    a proximal surface of a radially inwardly extending flange of the second component includes an annular groove.

12. A method of connecting a propeller shaft to a planetary gear carrier in a reduction gear box of a gas turbine engine, the method comprising:
    inserting, into a hollow cylindrical propeller shaft, a distal end of a nut having a cylindrical body with a helically threaded external surface;
    abutting a radially outwardly extending flange of the nut with a radially inwardly extending shoulder at a connector end of the propeller shaft;
    engaging a torque wrench tool in an axially extending interior tool socket of the nut; and
    engaging the helically threaded external surface of the nut with a helically threaded internal surface of an annular hub of a planetary gear carrier in an assembled position, the planetary gear carrier having an annular mounting surface abutting the connector end of the hollow cylindrical propeller shaft in the assembled position.

13. The method according to claim 12 comprising:
    installing an anti-rotation washer into an annular washer seat recess in the planetary gear carrier, the anti-rotation washer having an annular body with an internal tab extending radially inwardly and an external tab extending radially outwardly;
    engaging the internal tab of the anti-rotation washer into an inward anti-rotation slot in the distal end of the nut; and
    engaging the external tab of the anti-rotation washer into an outward anti-rotation slot of the planetary gear carrier.

14. The method according to claim 13 comprising:
    installing a washer retention ring in a retention recess within the planetary gear carrier.

15. A fastening system for a reduction gearbox planet carrier of a gas turbine engine, the fastening system comprising:
    a nut having a cylindrical body with a threaded external surface, an axially extending interior tool socket, and a radially outwardly extending flange at a proximal end of the cylindrical body;
    a propeller shaft including a hollow cylindrical tube with a connector end having a radially inwardly extending shoulder, the radially inwardly extending shoulder abutting the radially outwardly extending flange of the nut in an assembled position; and
    a planetary gear carrier including an annular hub with a threaded internal surface matching the threaded external surface of the nut, and an annular mounting surface abutting the connector end of the propeller shaft in the assembled position.

16. The fastening system according to claim 15 further comprising:
    an anti-rotation washer having an annular body with an internal tab extending radially inwardly and an external tab extending radially outwardly;
    the distal end of the nut including an inward anti-rotation slot engaging the internal tab of the anti-rotation washer in the assembled position; and
    the planetary gear carrier including an outward anti-rotation slot engaging the external tab of the anti-rotation washer in the assembled position.

17. The fastening system according to claim 16 wherein the planetary gear carrier includes an annular washer seat recess matching the annular body of the anti-rotation washer and wherein the outward anti-rotation slot extends radially from the annular washer seat recess.

18. The fastening system according to claim 17 comprising:
  a washer retention ring disposed in a retention recess within the planetary gear carrier in the assembled position, the retention recess being axially distal relative the annular washer seat recess.

19. An assembly comprising:
  a nut having a cylindrical body with a helically threaded external surface, an axially extending interior tool socket, and a radially outwardly extending flange at a proximal end of the cylindrical body;
  a first component including a hollow cylindrical tube with a connector end having a radially inwardly extending shoulder, the radially inwardly extending shoulder abutting the radially outwardly extending flange of the nut in an assembled position; and
  a second component including a helically threaded internal surface matching the helically threaded external surface of the nut, and an annular mounting surface abutting the connector end of the first component in the assembled position; and
  an anti-rotation washer having an annular body with an internal tab extending radially inwardly and an external tab extending radially outwardly, the distal end of the nut including an inward anti-rotation slot engaging the internal tab of the anti-rotation washer in the assembled position; the second component including an outward anti-rotation slot engaging the external tab of the anti-rotation washer in the assembled position;
  wherein the second component includes an annular washer seat recess matching the annular body of the anti-rotation washer, and wherein the outward anti-rotation slot extends radially from the annular washer seat recess.

20. The assembly according to claim 19, wherein one of the first and second components is a shaft and another one of the first and second components is a planetary gear carrier.

21. The assembly according to claim 19, wherein the connector end of the first component includes an annular ridge; and
  a proximal surface of a radially inwardly extending flange of the second component includes an annular groove.

* * * * *